United States Patent [19]
Nobuoka

[11] 3,987,156
[45] Oct. 19, 1976

[54] METHOD FOR MANUFACTURE OF MICACEOUS α-IRON OXIDE
[75] Inventor: Soichiro Nobuoka, Nara, Japan
[73] Assignee: Agency of Industrial Science & Technology, Tokyo, Japan
[22] Filed: Apr. 25, 1975
[21] Appl. No.: 571,849

Related U.S. Application Data
[63] Continuation-in-part of Ser. No. 87,262, Nov. 5, 1970, abandoned.

[30] Foreign Application Priority Data
Nov. 13, 1969 Japan................................ 44-91293

[52] U.S. Cl................................ 423/633; 423/551; 106/304
[51] Int. Cl.$^2$.......................................... C01D 49/02
[58] Field of Search ........... 423/632, 633, 634, 551; 106/304

[56] References Cited
UNITED STATES PATENTS
2,558,302   6/1951   Marcot et al. .................. 423/633 X
2,696,426   12/1954  Marcot ........................... 423/633 X
3,706,531   12/1972  Cozza et al. .................... 423/632 X FOREIGN PATENTS OR APPLICATIONS
2,056,042   5/1971   Germany ............................ 423/633
12,435      5/1968   Japan ............................... 423/633

Primary Examiner—G. O. Peters
Attorney, Agent, or Firm—Kurt Kelman

[57] ABSTRACT

Ferric sulfate obtained by the oxidation of ferrous sulfate or ferric sulfate available in its original state is added to an alkali hydroxide at a ratio such that the amount of said alkali hydroxide will be in excess of its stoichiometric proportion, so as to form a pasty substance. Then, this pasty substance is subjected to a hydrothermal treatment. From the resultant product of the treatment, there are obtained micaceous α-iron oxide crystals and aqueous solutions of sodium sulfate and alkali hydroxide.

2 Claims, 1 Drawing Figure

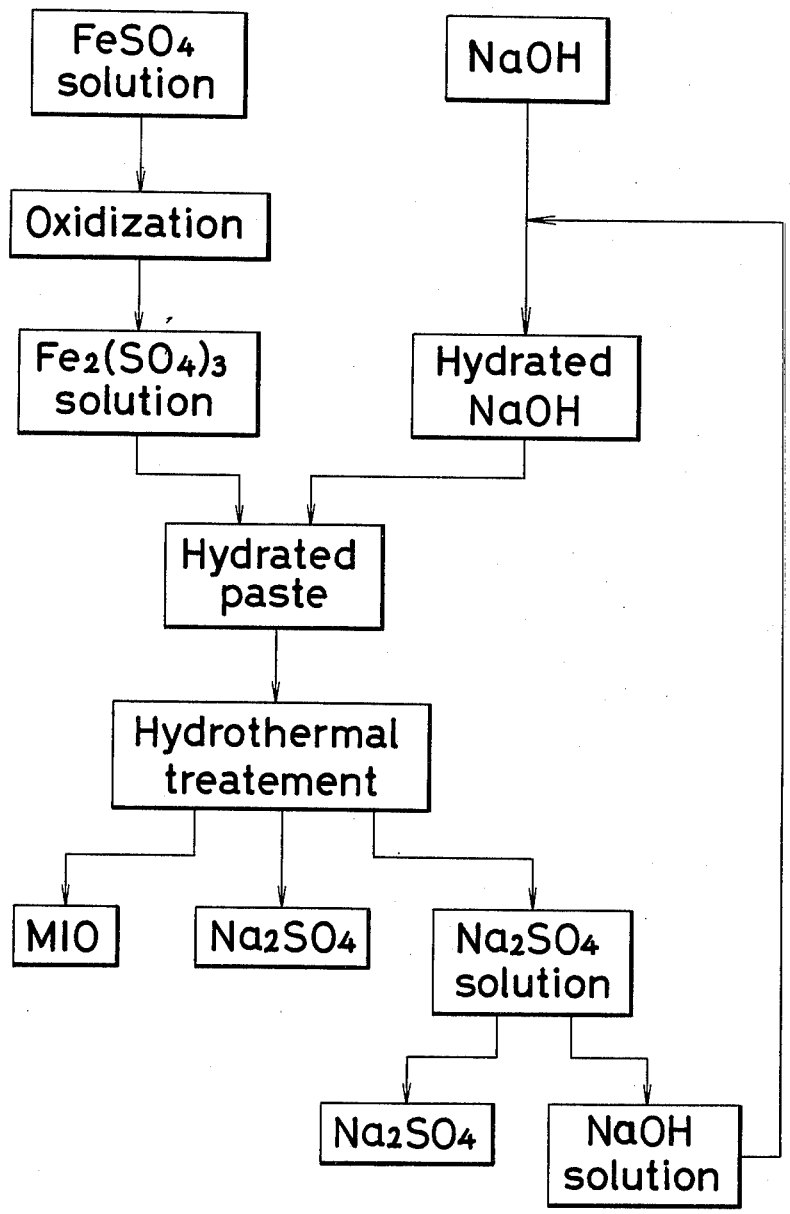

METHOD FOR MANUFACTURE OF MICACEOUS α-IRON OXIDE

REFERENCE TO COPENDING APPLICATION

This is a continuation-in-part of our copending application U.S. Ser. No. 87,262, filed Nov. 5, 1970, now abandoned.

This invention relates to a method for the manufacture of micaceous α-iron oxide (hereinafter referred to as "MIO"). More specifically, the present invention relates to a method for simultaneously manufacturing MIO in the shape of hexagonal lamellate crystals and sodium sulfate by treating with an excess amount of alkali either ferric sulfate available in its original state or ferric sulfate obtained by the oxidation of ferrous sulfate with an oxidizing agent and subjecting the resultant pasty substance to a hydrothermal treatment at a temperature in the range of from 150° C to 250° c.

Naturally produced MIO is a kind of hematite ($\alpha$-$Fe_2O_3$) and is in the shape of planar crystals resembling fish scales. Such natural MIO is found in Austria, Germany, England, Italy and other countries. Natural MIO occurs in conjunction with magnetite and a total of about 10% of alumina, silica, etc. Thus, the alpha-iron oxide content of the MIO ore is usually about 80%. It is already well known that a paint using MIO enjoys excellent resistance to corrosion and outdoor conditions. The excellent resistance displayed by the paint to corrosion and outdoor conditions is due to the fact that the MIO is arranged in parallel layers to form a coat on the surface of a substrate being coated. (H. W. Chatfield: Paint Tech., Vol. 30, No. 5, 26 (1966)) The method of the present invention can easily produce α-iron oxide by a procedure altogether different from that of the method just described.

For use in rustproof paints, the MIO is desired to have a particle diameter of not less than 20 microns.

Hitherto, it has been known to produce iron oxide in the form of single crystals by causing growth of crystals at a temperature of not less than 1,000° C in the presence of borax, lead pyrophosphate or some other substance as the flux.

The inventors of the present invention have already perfected a method for the manufacture of α-iron oxide in the form of single crystals as indicated in Japanese Pat. Publication No. 12435/1968 (U.S. Pat. No. 529,781). The Patent relates to a method which comprises mixing geothite or similar iron oxide or basic iron salt crystals such as a Jarosite with water to produce slurry and subjecting said slurry to a hydrothermal treatment to produce α-iron oxide in the form of single crystals. In this case, the goethite used as the raw material has a crystallizing property and, therefore, is not readily decomposed so that the largest particle diameter that the produced α-iron oxide can have is on the order of 15 microns. The method of said Japanese Pat. No. 529,781, therefore, cannot produce MIO possessing a particle diameter large enough for use in rustproof paints.

In order that a rustproof paint may acquire excellent properties, it is required that the MIO have a large particle diameter. When MIO having a large particle diameter is applied as a paint to an object, lamellate MIO particles are arranged in parallel within the film formed on the surface of the object and thereby the effectiveness of the film in shutting out the atmosphere and especially in shutting out ultraviolet rays is enhanced so that the protecting function of the film is increased.

For this reason, the MIO to be incorporated into the paint is required to have a particle diameter of at least 20 microns but not more than 50 microns. Heretofore, MIO having such a large particle diameter has been produced by first producing MIO having a small particle diameter according to the method of said Japanese patent, for example, and thereafter allowing crystals to grow from such small MIO particles as the seeds. In this manner of production, however, the process is complicated and it is next to impossible to obtain MIO particles whose particle diameter is as large as is desired and is distributed in a sufficiently narrow range.

By the present invention, MIO particles of which the particle diameter falls in the range of from 20 to 50 microns particularly suitable for the purpose of rustproof paints and is distributed in substantially a fixed range can be produced very easily.

The primary object of the present invention is to provide a method for the manufacture of MIO of which the particle diameter is between 20 and 50 microns.

Another object of this invention is to provide a method for simultaneously manufacturing MIO and sodium sulfate by using, as the raw material, ferric sulfate which is by-produced abundantly in the production of titanium dioxide, the pickling of iron and steel products, etc.

Still another object of this invention is to provide a method for the manufacture of MIO, which method permits ready control of the particle diameter of the MIO to be produced.

Other objects and features of the present invention will become apparent from the description given in detail herein below with reference to the accompanying drawing.

The drawing is a flow sheet illustrating one embodiment of the method of this invention.

As indicated in the drawing, ferrous sulfate is oxidized with an oxidizing agent to produce an aqueous solution of ferric sulfate and then a hydrated sodium hydroxide prepared by adding a small amount of water to sodium hydroxide is added to said aqueous solution of ferric sulfate to give rise to a mixed paste of hydrated ferric sulfate and hydrated alkali (which mixed paste will be referred to hereinafter as "hydrated paste"). When the hydrated paste thus produced is subjected to a hydrothermal treatment at a prescribed temperature, the iron present in the hydrated paste is substantially converted into MIO so that the hydrated paste is converted into an aqueous solution of sodium hydroxide and sodium sulfate containing the educed MIO. From this system, the educed MIO is isolated as a final product and sodium sulfate is easily separated as by cooling, for example. After their separation, there remains an aqueous solution having the alkali hydroxide as its principal component. This aqueous solution of alkali hydroxide may be recycled to the process of paste preparation.

Heretofore, the greater part of the ferrous sulfate byproduced in the production of titanium dioxide has been discarded and the minor remainder thereof has been utilized in the production of rouge, yellow iron oxide and sulfuric acid. The ferrous sulfate, if discarded in its unmodified form, can cause an environmental pollution and has posed a serious problem of disposal. In the method of the present invention, such ferrous sulfate can be used directly as the starting material.

The method of this invention uses as raw material ferric sulfate obtained by the oxidation of ferrous sulfate contained mainly in waste iron salt. If ferric sulfate is available from the beginning, then the method can dispense with the step of the oxidation of ferric sulfate.

Ferric sulfate is dissolved by added water thereto. The amount of water thus added is desired to be as small as necessary to form a solution of ferric sulfate which is in the state of saturation or supersaturation. If ferric sulfate is not dissolved in water at room temperature, application of some heat will overcome the difficulty. As the oxidizing agent for the oxidation of ferrous sulfate into ferric sulfate, there may be used nitric acid, chlorine gas or chlorate.

To the aqueous solution of high-concentration ferric sulfate, there is added an alkali hydroxide which may be in its unmodified state or in the state of a high-concentration solution prepared by addition of a small volume of water. As the alkali hydroxide, there is used sodium hydroxide or potassium hydroxide. The purity of this alkali hydroxide is not of great importance.

The ratio in which the alkali hydroxide and the ferric sulfate are mixed is governed by the following criterion: The mixing ratio should be such that the amount of the alkali hydroxide will represent an excess of the stoichiometric proportion in which the alkali hydroxide reacts with the ferric sulfate to produce ferric hydroxide, said excess being required to be such that the alkali content of the pasty substance with the exception of ferric hydroxide falls in the range of from 5N to 14N.

The reaction of the highly concentrated aqueous solution of ferric sulfate upon the alkali hydroxide is quite dissimilar to the reaction usually occurring between dilute aqueous solutions. In the aqueous solution described, no ionization occurs but precipitation proceeds as the hydrated precipitate of ferric salt encircles hydrated alkali and, at the same time, it encloses the circumference of ferric salt solution. In other words, the hydrated ferric salt which is composed mainly of ferric sodium hydroxide forms a passive state to function as a membrane for separating the aforementioned hydrated alkali and the ferric salt solution from each other. Thus, there is consequently obtained a pasty mixture having various highly heterogeneous and amorphous hydrates incorporated in an indefinite ratio.

As the next step, the hydrated paste having the amorphous ferric sodium hydroxide as the principal component is placed in a silver-lined autoclave, for example, and subjected to a hydrothermal treatment at a temperature higher than 150° C. When the hydrated paste being treated is in a small quantity, the application of heat may usually be discontinued as soon as the autoclave reaches the prescribed temperature in the hydrothermal treatment and, thereafter, the system may be left to cool off. In consequence of the hydrothermal treatment, the greater part of the ferric oxide present in said hydrated paste is converted into MIO in the shape of hexagonal plates. Where the hydrothermal treatment is made at a temperature below 150° C, the paste precipitate fails to undergo decomposition and, therefore, the formation of MIO does not ensue. The reaction velocity at which MIO is formed increases with the increasing temperature of the hydrothermal treatment. However, the pressure which the reaction vessel in use is required to withstand increases in proportion as the reaction temperature increases. Commercially desirable reaction temperatures, therefore, are between 150° C and 250° C. In case the hydrothermal treatment is carried out at a temperature of 200° C, the saturated pressure of steam is about 15 atmosphere. Since this is a pressure of the degree usual for ordinary boilers, the apparatus required for the treatment involving such pressure is not very difficult to manufacture.

The particle diameter of MIO can be controlled by adjusting the quantity of the alkali added in the course of said step. This is based on the fact that the greater the alkali concentration is in the hydrated paste being subjected to the hydrothermal treatment, the more will the educed planar crystals grow. MIO having an average particle diameter of about 20 microns is obtained by fixing the concentration of alkali a 5N excess relative to the hydrated paste. With a 14N excess, there is produced MIO having a particle diameter of 50 microns. Where the alkali concentration is less than 5N, the particle diameter of MIO fails to reach the lower limit 20 microns. Where the concentration is greater than 14N, however, there is formed sodium ferrite. This is because the alkali has a conspicuous effect on the crystallization of MIO as well as on the formation of hydrated paste. It is presumed that the solubility of MIO increases and the size of crystals grows with the increasing concentration of alkali. The liquid which remains after removal of the crystalline MIO contains sodium sulfate and alkali hydroxide. The sodium sulfate can be crystallized as by cooling and then extracted easily by filtration. After the removal of sodium sulfate, there remains an aqueous solution mainly of alkali hydroxide.

The MIO to be produced by the method of this invention is in the shape of hexagonal planar crystals. As regards the outward appearance, this MIO has a blackish purple to reddish purple color and blightly scintillating crystal faces. Under water, it exhibits a thixotropic property characteristic of planar crystals. This invention permits the particle diameter of MIO to be controlled relatively easily and, therefore, can produce MIO having a particle diameter selected from the range of between 20 and 50 microns to suit the particular intended use. By contrast, naturally occurring MIO consists of particles of different diameters and, when used in a paint, must be crushed so as not to cause clogging in the nozzle of a spray gun. No naturally occurring MIO has such a large particle diameter as contemplated by the present invention.

Further, the MIO of the present invention undergoes absolutely no quality degradation upon exposure to ultraviolet rays but possesses the property of absorbing rays of light having short wavelengths of 550 m$\mu$ and less. It also excels the natural MIO in resistance to acids, alkalis and heat. When a rustproofing paint is prepared by mixing this MIO with a suitable vehicle and it is applied to an iron or steel structure, the film thus formed is smooth and assumes an attractive appearance having a particular luster. This paint, therefore, may be used for purposes of overcoating and finishing.

In the present invention, there can be manufactured MIO having a particle diameter selected from the range of 20 to 50 microns to suit the occasion.

Now, a description is given of the coating test which was conducted on the paint using the MIO of the present invention and on paint using natural MIO.

Paints made up as shown in Table 1 were stirred for about 10 minutes in a high-speed dissolver, applied to test panels with the aid of an air spray, dried indoors for ten days, and exposed to the weather-ometer for 350 hours, with Erichsen test, impact test, checker tape test and discoloration test conducted before and after the exposure. The results are shown in Table 2. The particles of the MIO used in the test were about 25 microns in diameter and 1.0 micron in thickness, while the natural MIO used in the test was of the type available on the market.

Table 1

| Ingredient | (A) | (B) |
|---|---|---|
| Chlorinated rubber type varnish | 75(g) | 75(g) |
| MIO | 31 | 49 |
| Body Pigment | 4.5 | 7 |
| Additive | 2 | 2 |
| Pigment volume Concentration | 30(%) | 40(%) |

Table 2

| Paint | | Film Thickness (microns) | Ericksen 5mm Bf | Ericksen 5mm Aft | Ericksen 3mm Bf | Ericksen 3mm Aft | Impact 500g, 30cm Bf | Impact 500g, 30cm Aft | Checker tape test Bf | Checker tape test Aft | Degree discoloration |
|---|---|---|---|---|---|---|---|---|---|---|---|
| Synthetic MIO | (A) | 110–120 | ◎ | o | — | ◎ | ◎ | ◎ | ◎ | ◎ | No discoloration |
| | (B) | 120–130 | ◎ | o | — | ◎ | ◎ | ◎ | ◎ | ◎ | No discoloration |
| Natural MIO | (A) | 120–140 | ◎ | o | — | ◎ | o | ◎ | ◎ | ◎ | Discolored to white |
| Sample (I) | (B) | 150–160 | ◎ | Δ | — | ◎ | ◎ | ◎ | ◎ | ◎ | Discolored to white |
| Natural MIO | (A) | 120–130 | o | Δ | — | o | o | x | ◎ | ◎ | Slightly chalky white |
| Sample (II) | (B) | 140 | o | x | — | x | o | x | ◎ | ◎ | Slightly chalky white |
| Natural MIO | (A) | 120–130 | o | Δ | — | Δ | o | Δ | ◎ | ◎ | Chalky white |
| Sample (III) | (B) | 120–130 | Δ | x | — | x | o | x | ◎ | ◎ | Chalky white |

Referring to the preceding table, Samples (I), (II) and (III) were subjected to pulverization in a ball mill for 0 (zero), 5 and 16 hours respectively. The symbol "◎" denotes a case wherein the coated surface was totally free from abnormality, the symbol "o" a case wherein the coated surface produced cracks but suffered from little abnormality in film adhesiveness, the symbol "Δ" a case wherein the coated surface produced cracks and the film adhesiveness wad badly degraded and the symbol "x" a case wherein the film came off the surface.

It is apparent from Table 2 that the paints which used natural MIO suffered from chalking and film degradation in proportion to the duration of size reduction in the ball mill, possibly because the destruction of the plate shape of MIO progressed with the increasing period of size reduction.

The paint prepared by using the MIO of the present invention retained its color tone and film unimpaired through these tests. At the time of application to the test panel, the paint obtained from the MIO of the present invention could be applied to a greater thickness by one spraying than the other paints using natural MIO.

Next, paints of make-up (B) of Table 1 were prepared from three kinds of MIO of this invention having different particle diameters and from natural MIO, applied to test panels by the same procedure as mentioned above, dried, and subjected to Erickson test, impact test and peel test. The results are given in Table 3. In the table, the symbol "o" denotes a case wherein no abnormality was involved and the symbol "x" denotes a case wherein the film was peeled. It is clear from the table that, in the paints prepared from the MIO of this invention, the film adhesiveness increased with the increasing diameter of MIO particles used in the paints. It is also shown, however, that the paint using the synthetic MIO having a particle diameter of 3 – 6 microns enjoyed a nearly equal degree of film adhesiveness to that of the natural MIO paint.

Table 3

| Paint | MIO particle diameter (micron) | Film thickness | Ericksen peeling height (mm) | Impact 500g 20cm | 30cm | 40cm | 50cm |
|---|---|---|---|---|---|---|---|
| Synthetic MIO (I) | 3 – 6 | 100 | 1.5 – 2.0 | o | x | x | x |
| Synthetic MIO (II) | 15 – 20 | 100 | 2.0 – 3.0 | o | o | x | x |
| Synthetic MIO (III) | 25 – 30 | 100 | 3.0 – 6.0 | o | o | o | x |
| Natural MIO | — | 100 | 1.5 – 2.0 | o | x | x | x |

As is clear from the foregoing experiments, the paints prepared by using the MIO of this invention excel over the paints using conventional natural MIO in point of weatherability and adhesiveness. Among MIO of the present invention having different particle diameters, those which have particle diameters exceeding 20 microns provide better film adhesiveness than those which have smaller particle diameters.

The following Examples are further illustrative of this invention, and it will be understood that the invention is not limited thereto.

EXAMPLE 1

100g of ferrous sulfate having a purity of about 94% produced as a by-product in the production of titanium dioxide was combined with about 150 ml of water. The mixture was heated to the neighborhood of 60°C so as to allow the ferrous sulfate to be dissolved to a state near saturation. The resultant aqueous solution was exothermally oxidized by incorporating therein 10 ml of concentrated sulfuric acid (95% in purity) and 7g of sodium chlorate, with the result that the ferrous sulfate was converted into ferric sulfate. Next, 100 ml of an aqueous solution of 120g of sodium hydroxide was stirred into the resultant aqueous solution of ferric sulfate. The pasty hydrate so obtained was placed in a silver-lined autoclave and subjected to hydrothermal treatment at 200°C. When the autoclave reached the prescribed temperature, the application of heat was immediately discontinued and the autoclave was left to cool off. As the temperature of the autoclave fell to about 80°C, the reaction product was removed which consisted of MIO, sodium sulfate crystals and an aqueous solution. The supernatant was subjected to decantation to separate the precipitated MIO from the supernatant containing crystalline sodium sulfate. The MIO separated was washed with water, filtrated and dried into a product. The yield of this MIO was about 27.5g. The particles of the $\alpha$-iron oxide were about 23 microns in diameter and 1 micron in thickness. The crystals scintillated and had a specific gravity of 5.2.

After separation of sodium sulfate, the supernatant liquid was further cooled to 10°C to further precipitate, sodium sulfate. The yield of sodium sulfate reached about 50g including that previously removed. The mother liquid which remained was an aqueous solution of sodium hydroxide and could be put to reuse.

EXAMPLE 2

The manufacture of MIO was carried out in the same manner as in Example 1 except that the amount of sodium hydroxide added was varied so as to cause the concentration of excess sodium hydroxide in the pasty substance to fall in the range of from 3N to 14N. The relationship between the concentration of the excess sodium hydroxide in the pasty substance and the particle diameter of the MIO produced is shown in Table 4.

Table 4

| Concentration of Excess Sodium Hydroxide in Pasty Substance (N) | 3 | 4 | 5 | 6 | 7 | 8 | 9 | 10 | 11 | 12 | 14 |
|---|---|---|---|---|---|---|---|---|---|---|---|
| Particle Diameter of MIO Produced (micron) | 15 | 19 | 22 | 26 | 30 | 32 | 36 | 39 | 42 | 45 | 50 |

As is clear from the above table, the greater the excess quantity of sodium hydroxide, the more conspicuous the effect in the crystallization of $\alpha$-iron oxide and the larger the particle diameter of $\alpha$-iron oxide.

EXAMPLE 3

100g of ferrous sulfate (having a purity of about 945) produced as a by-product in the manufacture of titanium dioxide was combined with water to a total volume of about 150 ml and, while under agitation, heated to about 60°C to dissolve ferrous sulfate. To the resultant solution, 10 ml of concentrated sulfuric acid (about 95%) was added and 7g of sodium chlorate was further added to effect conversion and ferrous sulfate to ferric sulfate. Into the resultant solution, 150g of sodium hydroxide dissolved with water to a total volume of 100 ml was added while under agitation to produce a hydrated paste. The resultant hydrated paste was placed in a silverlined autoclave and heated to 200°C. When the contents of the autoclave reached the prescribed temperature, the application of heat was discontinued. Then the autoclave and its contents were allowed to cool off and, when they reached about 80°C, the reaction product was removed from the autoclave. The supernatant was removed by decantation and the precipitated MIO was obtained. Subsequently, the supernatant was cooled to about 10°C to induce crystallization of sodium sulfate. Thus, there was obtained about 50g of sodium sulfate crystals. The MIO was washed with water, filtered, and dried into a final product. The yield was about 27.5g. The particles of $\alpha$-iron oxide were about 32 microns in diameter and about 1.0 micron in thickness. As concerns the appearance, the product was dark purple, very fine in size and the crystal surface scintillated.

EXAMPLE 4

The ferrous sulfate used herein as a raw material was recovered from the spent liquid coming out of a steel pickling operation. This ferrous sulfate had a purity higher than 98%, a figure better than that of the ferrous sulfate produced as a by-product in the titanium dioxide production. To 5 kg of this ferrous sulfate, there was added what had been obtained by diluting 220 ml of concentrated sulfuric acid with water to a total volume of 1l. The addition did not bring the ferrous sulfate to complete dissolution. When 450 cc of nitric acid was added by degrees to the mixture while under agitation, the ferrous sulfate dissolved gradually. The reaction system was heated to 80° – 90° C to accelerate the oxidation, converting the ferrous sulfate completely to the ferric sulfate. The aqueous solution of ferric sulfate thus obtained was diluted with water to a total volume of 4l. Separately, 7 kg of sodium hydroxide was dissolved with water to a total volume of 6l. From the said aqueous solution of ferric sulfate and the aqueous solution of sodium hydroxide, there was produced a precipitate containing ferric hydroxide as the main component. Since this precipitation originated from concentrated aqueous solutions, it gave rise to a pasty precipitate having various hydrates incorporated into the main component of ferric hydroxide. In the mixing rates mentioned above, this precipitate had a volume of about 10l. In this case, the concentration of sodium hydroxide in the paste was 12N. This precipitate was placed in an autoclave and subjected to hydrothermal treatment at about 200°C for about 2 hours with continuous agitation. This hydrothermal treatment converted the pasty precipitate completely into $\alpha$-iron oxide crystals having the shape of hexagonal lamellae. The autoclaved mass was removed and then separated into crystals and mother liquor. The crystals were washed with water, filtrated, and dried into a finished product. The yield was about 1.3 kg. The particles of the MIO were about 40 microns in length and about 2 microns in thickness. As concerns outward appearance, the product had a metallic luster and scintillated brightly. The MIO of this particle diameter is found suitable for use in rust-preventing paints and metallic paints.

COMPARATIVE EXAMPLE 10 ml of concentrated sulfuric acid was dissolved in a 150 ml solution obtained by adding water to 100g of ferrous sulfate. 7g of sodium chlorate was further added to the resultant solution for thereby oxidizing the ferrous sulfate into ferric sulfate. 100 ml of hydrated sodium hydroxide containing 100g of sodium hydroxide was added to the resultant solution to obtain paste hydrate. The concentration of excess sodium hydroxide in the paste hydrate thus obtained was about 4N. The paste hydrate was introduced into an autoclave and was subjected to hydrothermal treatment at 200°C. As a result, MIO having a particle diameter of about 17 microns and a particle thickness of 1 micron was obtained. Since the concentration of the excess sodium hydroxide did not reach 5N in this Comparative Example, the particle diameter of the MIO obtained was less than 20 microns.

A temperature above 150°C is required in order to obtain MIO. The higher the temperature is, the higher the reaction speed is. A temperature in the range of 180° – 200°C is economically suitable.

What is claimed is:

1. In a method for the manufacture of micaceous iron oxide by preparing an aqueous solution of ferric sulfate, mixing the resultant aqueous solution of ferric sulfate with an aqueous solution of sodium hydroxide at a ratio such that the concentration of the alkali hydroxide in the mixture will represent an excess of the stoichiometric proportion necessary for the formation of ferric hydroxide whereby there is formed a hydrated paste which is subjected to a hydrothermal treatment thereby producing a solution containing therein α-iron oxide in the shape of hexagonal lamellate crystals in conjunction with $Na_2SO_4$ and alkali hydroxide, the improvement which consists essentially of:

a. separating from said solution said α-iron oxide to obtain α-iron oxide in the shape of hexagonal lamellate crystals;
   b. separating $Na_2SO_4$ crystals by crystallization from the liquid which remains after said separation of α-iron oxide;
   c. obtaining consequently an aqueous solution of alkali hydroxide; and
   d. wherein the aqueous solution of alkali hydroxide from the step (c) is used for mixture with ferric sulfate.

2. In a method for the manufacture of micaceous iron oxide by preparing an aqueous solution of ferrous sulfate, adding an oxidizing agent to said solution to oxidize said ferrous sulfate to ferric sulfate, mixing the resultant aqueous solution of ferric sulfate with an aqueous solution of sodium hydroxide at a ratio such that the concentration of the alkali hydroxide in the mixture will represent an excess of the stoichiometric proportion necessary for the formation of ferric hydroxide whereby there is formed a hydrated paste which is subjected to a hydrothermal treatment thereby producing a solution containing therein α-iron oxide in the shape of hexagonal lamellate crystals in conjunction with $Na_2SO_4$ and alkali hydroxide, the improvement which consists essentially of:

a. separating from said solution said α-iron oxide to obtain α-iron oxide in the shape of hexagonal lamellate crystals;
   b. separating $Na_2SO_4$ crystals by crystallization from the liquid which remains after said separation of α-iron oxide,
   c. obtaining consequently an aqueous solution of alkali hydroxide; and
   d. wherein the aqueous solution of alkali hydroxide from the step (c) is used for mixture with the aqueous solution of ferric sulfate.

* * * * *